Feb. 23, 1937.                E. L. HARDER                2,071,832
COMPENSATOR FOR METERING SYSTEMS
Filed Nov. 29, 1935
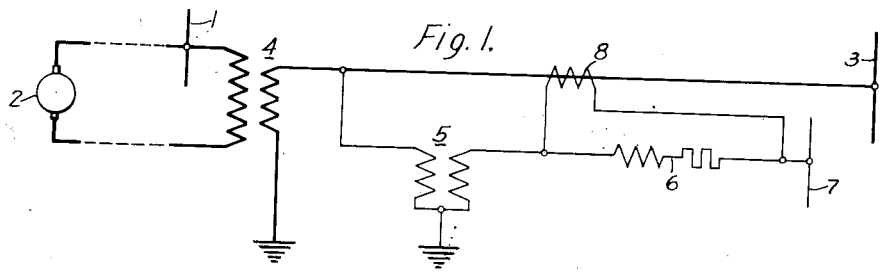
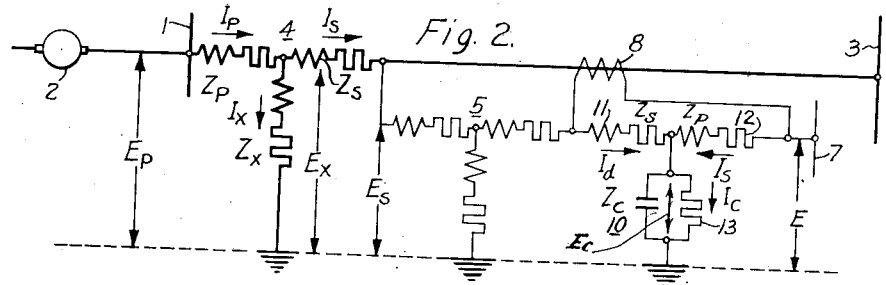
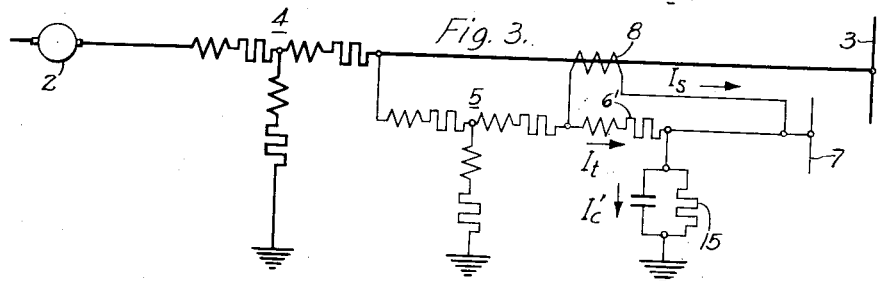
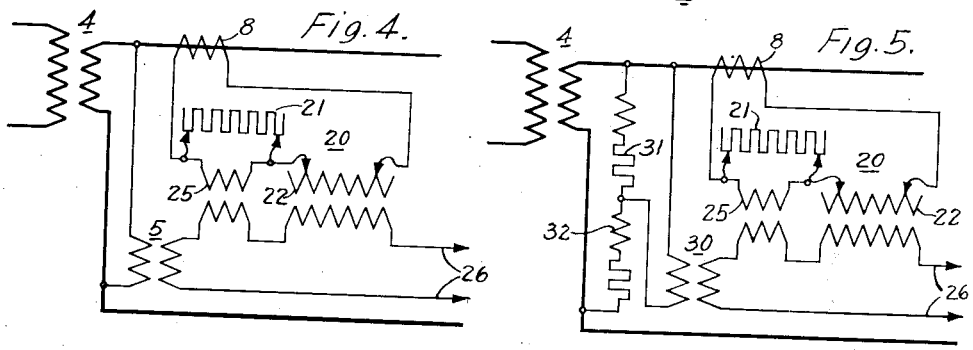
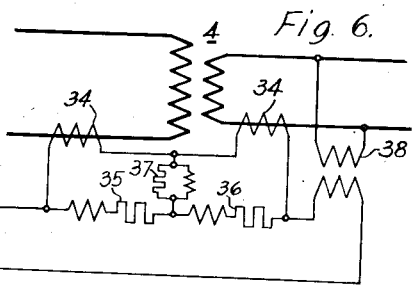
WITNESSES:
Michael Stark
Geo. O. Harrison
INVENTOR
Edwin L. Harder.
BY
ATTORNEY Patented Feb. 23, 1937

2,071,832

UNITED STATES PATENT OFFICE 2,071,832

COMPENSATOR FOR METERING SYSTEMS

Edwin L. Harder, Forest Hills, Pittsburgh, Pa., assignor to Westinghouse Electric & Manufacturing Company, East Pittsburgh, Pa., a corporation of Pennsylvania Application November 29, 1935, Serial No. 52,121

8 Claims. (Cl. 171—97)

My invention relates to compensators for use with alternating-current power apparatus, and particularly to such compensators for correcting the impedance effects of power transformers on metering variables derived from the transformer low-voltage circuits, so as to provide accurate measurement of high-voltage quantities without the use of high-voltage measuring apparatus.

In compensators as heretofore proposed for such applications, the series impedance effects of the power transformers have been offset by means of a compensator impedance, through which, a current proportional to the power transformer primary or secondary current, is circulated. Such compensators, however, make no allowance for the difference between primary and secondary transformer quantities which exists because of the magnetization and core loss of the transformer. Such compensators, accordingly, operate with an error which becomes of considerable magnitude in the cases where the transformer magnetizing current is a relatively large part of the total transformer current. Also, impedance drop compensators have previously been used for relaying where errors of 1% or more are allowable. For metering service, however, errors of .1% must be considered.

It is an object of my invention to provide a novel compensator of the type indicated above which will compensate for the voltage magnitude and phase angle errors caused by the flow of transformer magnetizing current through the transformer leakage impedance and provide a metering voltage within the accuracy limits indicated.

Other objects of my invention will become evident from the following detailed description taken in conjunction with the accompanying drawing, in which Figure 1 is a diagrammatic view of an alternating-current power transformer circuit provided with a compensator of the prior art.

Fig. 2 is an impedance diagram of the circuit shown in Fig. 1 with a novel compensating network substituted for the compensator impedance of Fig. 1.

Fig. 3 is a view similar to Fig. 2 of a circuit embodying a simplified compensating network; and Figs. 4 to 6, inclusive, are diagrammatic views of compensators embodying my invention.

Referring to Fig. 1, a high-voltage bus 1 is energized from any suitable alternating-current source shown as a generator 2, and is connected to a low-voltage bus 3 by means of a power transformer 4. A potential transformer 5 is connected to the secondary circuit of the power transformer 4 to provide a suitable low voltage, of the order of 110 volts for example, for metering and relaying purposes. The secondary circuit of the potential transformer 5 is connected, in series with a compensator impedance 6, to a metering bus 7.

The compensator impedance 6 may have any absolute value but must have the same impedance phase angle as the total series impedance of the power transformer 4, considered from its primary or secondary circuit. A current transformer 8, energized from the secondary circuit of the power transformer 4, is connected to the compensator impedance 6 in such direction as to produce an impedance drop therein which adds to the secondary voltage of the potential transformer 5 when the direction of power flow in the main transformer circuit is from the high-voltage bus 1 to the low-voltage bus 3. The turn ratio of the current transformer 8 is related to the absolute impedance of the compensator 6 in such a manner that the impedance drop in the compensator impedance 6 bears the same ratio to the secondary voltage of the potential transformer 5 as the impedance drop in the main transformer 4 bears to its secondary terminal voltage.

The system of the prior art, shown diagrammatically in Fig. 1, is subject to a number of errors, of which that caused by the flow of magnetizing current through the series impedance of the main transformer 4 is of principal interest in connection with the present application. The presence of this error may be easily demonstrated by considering the load current drawn from the secondary bus 3 to be zero. Under this condition the impedance drop through the compensator impedance 6 is zero, as is the impedance drop in the secondary winding of the main transformer. The magnetizing current of the main transformer 4 flows through the primary winding of the latter, however, and the resulting voltage drop in the transformer primary winding produces a difference of magnitude and phase angle between the primary terminal voltage and the induced voltage of the transformer 4.

The novel means by which I compensate for the error mentioned above may better be understood by reference to Fig. 2, which shows the circuit of Fig. 1 in equivalent impedance form with a compensating network 10 of my invention substituted for the compensating impedance 6 of Fig. 1.

The network 10 consists of two series impedance branches 11 and 12 and a shunt admittance branch 13, connected to form a T-mesh. The series impedance branches 11 and 12 correspond to the primary and secondary leakage-impedances of the power transformer 4 and are designed to produce IZ drops equivalent to those existing in the corresponding windings of the power transformer 4 but acting in the opposite direction. As the secondary current of the current transformer 8 is approximately in phase with the secondary current of the power transformer 4, the impedances 11 and 12 must have approximately the same phase angle as the corresponding leakage impedances of the transformer 4. The absolute magnitude of the impedances 11 and 12 depends upon the ratio of the current transformer 8. For simplicity, it will be assumed that the impedance branches 11 and 12 have impedance values equal in absolute magnitude and phase angle to the corresponding quantities of transformer 4, reduced through the turn ratios of the power transformer 4 and potential transformer 5 to a common basis, in a manner well understood in the art.

The shunt impedance branch 13 serves to draw a current through the series branch 11 of such magnitude and phase angle that the IZ drop through the impedance 11 will raise the voltage across the shunt 13 a sufficient amount to compensate for the loss of voltage in the primary winding of transformer 4 caused by exciting current. In the preferred arrangement, the impedance 11 is inductive, and the shunt impedance 13 must accordingly be capacitive, as a leading current is necessary to effect the necessary increase of voltage. It will be shown hereinafter that the impedance of the shunt 13 should be of the same order of magnitude as the magnetizing impedance of the power transformer 4, reduced through the ratios of the power transformer 4 and potential transformer 5, but should be capacitive rather than inductive.

The operation of the circuit of Fig. 2 may better be understood by considering the circuit analytically. In the following, capital letters are used to denote complex quantities, lower case letters are used as subscripts, scalar quantities, are denoted by capital letters surmounted by a bar, and the conjugate of any complex quantity, if used, is denoted by the corresponding capital letter surmounted by a circumflex accent.

Let $E_p$ = primary terminal voltage of transformer 4
$E_x$ = internal induced voltage of transformer 4
$E_s$ = secondary terminal voltage of transformer 4
$Z_p$ = primary leakage-impedance of transformer 4
$Z_s$ = secondary leakage-impedance of transformer 4
$Z_x$ = exciting impedance of transformer 4
$I_p$ = primary current of transformer 4
$I_s$ = secondary current of transformer 4
$I_x$ = exciting current of transformer 4
$E$ = voltage at meter bus 7
$E_c$ = voltage across the compensator shunt 13
$Z_c$ = impedance of compensator shunt 13
$I_c$ = current in compensator shunt 13
$I_d$ = current in impedance branch 11

Assuming that the turn ratios of the power transformer 4 and potential transformer are unity, in order to simplify the calculations $Z_s$ = impedance of series element 11
$Z_p$ = impedance of compensator series element 12

Neglecting the impedance and exciting current of the potential transformer 5;

$E_s$ = input voltage to compensator 10

The voltage E at the meter bus 7 in terms of the primary impressed voltage $E_p$ and impedance drops is $$E = E_p - I_p Z_p - I_s Z_s - I_d Z_s + I_s Z_p \quad (1)$$

The relationship of currents in the power transformer 4 is $$I_p = I_s + I_x \quad (2)$$

The relationship of currents in the compensator 10 is $$I_d = I_c - I_s \quad (3)$$

Substituting (2) and (3) in (1)

$$E = E_p - (I_s + I_x) Z_p - I_s Z_s - (I_c - I_s) Z_s + I_s Z_p = E_p - I_x Z_p - I_c Z_s \quad (4)$$

The voltage across the compensator shunt 13, in terms of the main transformer induced voltage and IZ drops is $$E_c = E_x - I_s Z_s - I_d Z_s \quad (5)$$

Substituting (3) in (5)

$$E_c = E_x - I_s Z_s - (I_c - I_s) Z_s = E_x - I_c Z_s \quad (6)$$

In a power transformer of ordinary design, the terms $I_s Z_s$ and $I_p Z_p$ are of the order of 2% to 7% of $E_p$ at full load. The terms $I_x Z_p$ and $I_c Z_s$ are of the order of .1% to .3% of $E_p$ at full load. By calculating $Z_c$ upon the basis that the terms $I_c Z_s$ of Equation (6) is zero, an error of the order of .2% will be introduced in the value of $Z_c$. However, as the total error to be corrected is of the order of 3% or 4%, the error of .2% in $Z_c$ will introduce an error of the order of .04×.002, or .008% in the meter reading. The term $I_c Z_s$ can accordingly be neglected with negligible error, leaving for Equation (6)

$$E_c = E_x \quad (7)$$

The main transformer exciting current is $$I_x = \frac{E_x}{Z_x} \quad (8)$$

The current through the compensator shunt 13 is $$I_c = \frac{E_c}{Z_c} \quad (9)$$

In order to eliminate the error of meter reading, the difference between $E_p$ and E must be made zero. Accordingly, from Equation (4)

$$-I_x Z_p - I_c Z_s = 0$$

or $$I_c = -I_x \frac{Z_p}{Z_s} \quad (10)$$

Substituting (8) and (9) in (10)

$$\frac{E_c}{Z_c} = -\frac{E_x Z_p}{Z_x Z_s} \quad (11)$$

However, substituting (7) in (11) and rearranging $$Z_c = -Z_x \frac{Z_s}{Z_p} \quad (12)$$

The quantity $$Z_x \frac{Z_s}{Z_p}$$

for most transformers has a lagging phase angle approaching 90° in value, and the shunt impedance $Z_c$ can accordingly be the equivalent negative reactance, i. e., a capacitor of appropriate size.

Instead of dividing the compensator series impedance in two parts as in Fig. 2, this impedance may be lumped, by providing a shunt impedance 15 of suitable value. In Fig. 3, the lumped series impedance is shown at 6' and, for simplicity, is assumed to have a value of $Z_p+Z_s$, reduced through turn ratios, as explained above. The value of shunt impedance $Z'_c$ necessary to compensate the exciting current error in the circuit of Fig. 3 may be calculated as follows:

Let $Z_t$=total series impedance of the power transformer 4
$I_t$=current in the series impedance 6'
$Z_c$=impedance of shunt 15
$I'_c$=current in shunt 15

The symbols $E_p$, $I_p$, $Z_p$, $E_s$ etc., are used to denote the same quantities as in connection with Fig. 2.

The impedance $Z_t$ is by definition.

$$Z_t=Z_p+Z_s \tag{13}$$

The meter bus voltage E in terms of the primary voltage $E_p$ and IZ drops is $$E=E_p-I_pZ_p-I_sZ_s-I_tZ_t \tag{14}$$

The current relationship in the power transformer 4 is $$I_p=I_s+I_x \tag{15}$$

The current relationship in the compensator 10 is $$I'_c=I_t+I_s \tag{16}$$

Substituting values of $I_t$ from (16) and $Z_t$ from (13) in (14)

$$E=E_p-I_pZ_p-I_sZ_s-(I'_c-I_s)(Z_p+Z_s)= \\ E_p-I'_c(Z_p+Z_s)-I_xZ_p \tag{17}$$

Neglecting the terms $I'_c(Z_p+Z_s)$ and $I_xZ_p$ as of negligible value, Equation (17) becomes $$E=E_p \tag{18}$$

The exciting current of power transformer 4 is $$I_x=\frac{E_x}{Z_x} \tag{19}$$

The current through the compensator shunt 15 is $$I'_c=\frac{E_c}{Z_c'} \tag{20}$$

In order to eliminate the error of meter reading, the difference between $E_p$ and E is made zero. From (17)

$$-I'_c(Z_p+Z_s)-I_xZ_p=0$$

or $$I'_c=-I_x\frac{Z_p}{Z_p+Z_s} \tag{21}$$

Substituting (19) and (20) in (21)

$$\frac{E_c}{Z_c'}=-\frac{E_x}{Z_x}\cdot\frac{Z_p}{Z_p+Z_s}$$

Rearranging $$Z_c'=-\frac{E_c}{E_x}Z_x\cdot\frac{Z_p+Z_s}{Z_p} \tag{22}$$

However, as $E_c=E_x$ approximately, Equation (22) may be rewritten $$Z_c'=-Z_x\cdot\frac{Z_p+Z_s}{Z_p} \tag{23}$$

From (23) it may be seen that a somewhat higher value of capacitive impedance is required in the shunt 15 of Fig. 3, as compared with the shunt 13 of Fig. 2. The higher value is preferable because of lower losses and lower value of capacitance in the shunt. Also because of the simplicity of the compensator of Fig. 3, this circuit is commercially preferable to that of Fig. 2.

In the circuits of Figs. 1 to 3, no allowance has been made for the IZ drop produced by the flow of meter burden current through the compensator impedance. This IZ drop may be substantially neutralized by means of the circuit disclosed in my copending application, Serial No. 52,122, filed November 29, 1935 and assigned to the Westinghouse Electric & Manufacturing Company. Alternatively, the effect of the IZ drop produced by the meter burden current can be reduced to a fractional value by using an inductive coupling between the compensator impedances and the meter potential circuit, as illustrated in Figs. 4 and 5.

Fig. 4 shows a novel compensating circuit which can be used in applications where the primary impedance $Z_p$ of the main transformer 4 has substantially the same impedance phase angle as the main transformer exciting impedance $Z_x$. In such applications, the exciting current impedance drop $I_xZ_p$ in the primary of the main transformer is in phase with the main transformer induced voltage $E_x$, permitting a simplification of the exciting current compensation apparatus, as will be explained. In the circuit of Fig. 4, the compensator includes an inductive coupling between the potential circuit and compensator equivalent impedance for reducing the error caused by the flow of meter burden current through the compensating impedance as mentioned above. It will be understood, however, that a simple series compensator impedance, such as shown at 6 in Fig. 1, may be used in the circuit of Fig. 4 without effect upon the exciting current compensation.

Considering Fig. 4 in detail, the main transformer 4 has exciting impedance $Z_x$ and primary impedance $Z_p$ of substantially the same phase angle, as mentioned above. A current transformer 8 is energized from the secondary circuit of the main transformer 4 as in Figs. 1 to 3. The secondary winding of the current transformer 8 is connected in series with a compensator 20, consisting of a tapped resistance section 21 and a tapped reactance section 22.

The reactance section 22 of the compensator 20 preferably consists of two mutually inductive windings mounted on a common iron core (not shown) having an air gap. The resistance section 21 is coupled to a potential bus 26 by means of a low-voltage potential transformer 25. The potential transformer 25 and reactance section 22 have suitable ratios such as 10:1 for transforming the IX and IR drops in the resistance section 21 and reactance section 22, respectively, to comparatively low values in the meter potential circuit.

The constants of the compensator 20 and the ratio of current transformer 8 are so related as to produce voltage drops in the circuit of the potential bus 26 having the same ratio to the secondary voltage of potential transformer 5 as the total series impedance drop of the power transformer 4, considered on a primary basis, bears to the main transformer primary voltage.

The insulating potential transformer 5 is connected between the secondary circuit of the main transformer 4 and the potential bus 26 in the usual manner. The ratio of the potential transformer 5 instead of being the overall transformation ratio of the installation divided by the ratio of the power transformer 4, as would ordinarily be the case is $$\overline{R}_p = \frac{\overline{R}_o}{\overline{R}_t}\left(1 - \frac{Z_p}{Z_x}\right) \quad (24)$$

where $\overline{R}_p$ = ratio of potential transformer 5

$\overline{R}_o$ = overall transformation ratio of the installation or $$\frac{\overline{E}_p}{\overline{E}}$$

$\overline{R}_t$ = transformation ratio of the power transformer 4.

The validity of (24) will be apparent by considering that the impedance drop $I_x Z_p$ produced by the exciting current in the primary winding of the power transformer 4 is in phase with the induced voltage $I_x Z_x$. The error to be compensated, accordingly, reduces the induced voltage of the power transformer in the ratio $$\frac{(Z_x - Z_p)}{Z_x} \text{ or } \frac{(1 - Z_p)}{Z_x}.$$

If the primary impedance $Z_p$ of the power transformer has a phase angle materially different from that of the exciting impedance $Z_x$, some form of impedance shunt is necessary to produce the voltage shift required for exact exciting current compensation, except in polyphase application where vector ratios are obtainable. This impedance shunt may take the forms shown in Figs. 2 and 3 or may be included in the primary circuit of the insulating potential transformer, as in Fig. 5. In Fig. 5, the various elements are similar to the corresponding elements of Fig. 4, except that a potential transformer 30 of different design from the potential transformer 5 of Fig. 4, is provided, and the potential transformer 30 is energized by means of potentiometer impedances 31 and 32.

The potentiometer impedances 31 and 32 may have any desired absolute magnitudes, dependent upon the voltage available and the permissible power loss. The magnitudes and phase angles of these impedances, however, must be related, so that $$\frac{Z_{31}}{Z_{32}} = \frac{Z_p}{Z_x - Z_p} \quad (25)$$

where $Z_{31}$ = impedance of impedance element 31

$Z_{32}$ = impedance of impedance element 32

With this relationship of impedances, it will be apparent that the change in magnitude and phase position of the power transformer induced voltage $E_x$, produced by the impedance drop $I_x Z_p$, will be compensated in the potentiometer consisting of impedances 31 and 32. The ratio of potential transformer 30 in this arrangement may be $$\overline{R}_{30} = \frac{\overline{R}_o}{\overline{R}_t} \quad (26)$$

where $\overline{R}_{30}$ = ratio of potential transformer 30.

Fig. 6 shows an arrangement for use where current transformers 34 are available on both sides of the power transformer 4, and the external power circuits are such that power may flow through the transformer 4 in either direction. In such an application, series impedances 35 and 36 corresponding to the power transformer $Z_p$ and $Z_s$ and a shunt impedance 37 corresponding to the exciting impedance $Z_x$, may be connected to duplicate in miniature the IZ drops in the power transformer. The insulating potential transformer is shown at 38.

Although the invention has been described as specifically applied for the compensation of exciting current drop in a power transformer, it will be obvious that the invention is equally applicable to the compensation of similar effects produced by equivalent series impedance and equivalent shunt admittance in any alternating current circuit. It will also be obvious that the potential transformers shown and described serve merely as mutual impedances, and that other known mutual impedance devices, serving a similar purpose, may be substituted in the practice of the invention.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In an alternating-current system, a high-voltage alternating-current circuit having equivalent series impedance and equivalent shunt admittance associated therewith, a potential circuit, energizing means for said potential circuit including a mutual impedance device for applying reduced voltage derived from said alternating current circuit to said potential circuit, said energizing means including a series impedance element and including an impedance shunt connected on the load side of at least part of said series impedance element, said impedance shunt being designed to produce a voltage drop in said series impedance element equivalent in value but opposite in sign to the impedance drop in said equivalent series impedance caused by said equivalent shunt admittance.

2. In an alternating-current system, a power transformer, a source of primary voltage for said transformer, a potential circuit, energizing means for said potential circuit including a mutual impedance device for applying reduced voltage derived from said source to said potential circuit, said energizing means including a series impedance element and including an impedance shunt connected on the load side of at least part of said series impedance element, said impedance shunt being designed to produce a voltage drop in said series impedance element equivalent in value but opposite in sign to the primary impedance drop of said power transformer caused by the exciting current thereof.

3. In an alternating-current system, a power transformer, a source of primary voltage for said transformer, a potential circuit, and energizing means for said potential circuit including an impedance network comprising series and shunt impedance elements, and means for energizing a series impedance element of said network in accordance with a current quantity derived from said power transformer, said network being designed to compensate for the effects of primary and secondary self-impedance and of exciting current of said power transformer.

4. In an alternating-current system, a power transformer, a source of primary voltage for said transformer, a potential circuit, energizing means for said potential circuit including a mutual impedance device for applying reduced voltage derived from said source to said potential circuit, said energizing means including a series compensating impedance, means for energizing said compensating impedance in accordance with a current quantity derived from said power transformer, and an impedance shunt connected on the load side of at least part of said compensating impedance.

5. In an alternating-current system, a power transformer, a source of primary voltage for said transformer, a potential circuit, energizing means for said potential circuit including a mutual impedance device for applying reduced voltage derived from said source to said potential circuit, said energizing means including a series compensating impedance corresponding to the primary self-impedance of said power transformer, a series compensating impedance corresponding to the secondary self-impedance of said power transformer, means for energizing said compensating impedances in accordance with current quantities derived from said power transformer, and a shunt impedance corresponding to the exciting impedance of said power transformer connected between said series compensating impedances.

6. In an alternating-current system, a power transformer, a source of primary voltage for said transformer, a potential circuit, energizing means for said potential circuit including a mutual impedance device for applying reduced voltage derived from said source to said potential circuit, said energizing means including a series compensating impedance corresponding to the primary and secondary self-impedance of said transformer reduced to a common circuit basis, means for energizing said compensating impedance in accordance with a current quantity derived from said power transformer, and a shunt impedance connected on the load side of said series impedance to correct for the effect of exciting current.

7. In an alternating-current system, a power transformer having primary self-impedance $Z_p$ and exciting impedance $Z_x$ of substantially the same phase angle, said transformer having a predetermined turn ratio $R_t$, a source of primary voltage for said transformer, and potential supply means having an overall transformation ratio $R_o$ comprising a potential circuit, and a mutual-impedance voltage reducing device energized in accordance with a voltage condition derived from said power transformer for supplying said potential circuit, said mutual-impedance device having a ratio $R_p$ of substantially $$R_p = \frac{R_o}{R_t}\left(1 - \frac{Z_p}{Z_x}\right)$$

whereby the voltage of said potential circuit is independent of the component of primary impedance drop of said power transformer caused by exciting current.

8. In an alternating-current system, a power transformer having primary self-impedance $Z_p$ and exciting impedance $Z_x$ of substantially the same phase angle, said transformer having a predetermined turn ratio $\overline{R}_t$, a source of primary voltage for said transformer, and potential supply means having an overall transformation ratio $\overline{R}_o$ comprising a potential circuit, a series compensating impedance, an energizing circuit for said potential circuit including said compensating impedance, means for circulating through said compensating impedance a current quantity derived from said power transformer, and a potential transformer responsive to a voltage derived from said power transformer for supplying said energizing circuit, said potential transformer having a turn ratio $\overline{R}_p$ of substantially $$\overline{R}_p = \frac{\overline{R}_o}{\overline{R}_t}\left(1 - \frac{Z_p}{Z_x}\right)$$

EDWIN L. HARDER.